US008024215B2

(12) United States Patent
Mount (10) Patent No.: US 8,024,215 B2
(45) Date of Patent: Sep. 20, 2011

(54) MANAGING SALES AND/OR COMPETITION WITHIN AN INDUSTRY

(75) Inventor: Gregory Roy Mount, Bad Homburg (DE)

(73) Assignee: CSM Worldwide, Inc., Northville, MI (US)

( * ) Notice: Subject to any disclaimer, the term of this patent is extended or adjusted under 35 U.S.C. 154(b) by 956 days.

(21) Appl. No.: 11/552,755

(22) Filed: Oct. 25, 2006

(65) Prior Publication Data

US 2008/0103872 A1    May 1, 2008

(51) Int. Cl.
*G06F 17/00* (2006.01)
(52) U.S. Cl. ...................................... 705/7.31
(58) Field of Classification Search ............... 705/10, 705/7.31
See application file for complete search history.

(56) References Cited

U.S. PATENT DOCUMENTS

| 6,035,284 | A   | * | 3/2000  | Straub et al. ........... 705/28 |
| 7,184,892 | B1  | * | 2/2007  | Dyer et al. ............. 702/5  |
| 2003/0220773 | A1 | * | 11/2003 | Haas et al. ............ 705/10 |
| 2005/0004789 | A1 | * | 1/2005  | Summers ............... 703/22 |
| 2005/0256778 | A1 | * | 11/2005 | Boyd et al. ............ 705/26 |
| 2007/0136271 | A1 |   | 6/2007  | Masuyama et al.               |
| 2007/0288297 | A1 | * | 12/2007 | Karras et al. .......... 705/10 |

FOREIGN PATENT DOCUMENTS

EP    1783624    7/2005

OTHER PUBLICATIONS

Acharya et al; Market Structure, Competition and Productivity Growth and Evidence from Canadian Manufacturing Industries; May 2005; pp. 1-38.*
CSM Client Briefing: Powertrain & Technology Outlook Economics for Strategic Thinking Tokyo, Japan Oct. 27, 2005.
CSM Client Briefing: Powertrain & Technology Outlook Economics for Strategic Thinking Novi, MIchigan Nov. 16, 2005.
Herfindahl Index, AmosWEB Encyclonomic WEB*pedia, http://www.AmosWEB.com, AmosWEB LLC, 2000-2007. [Accessed: Dec. 17, 2007].

* cited by examiner

*Primary Examiner* — Thomas Dixon
(74) *Attorney, Agent, or Firm* — Blakely Sokoloff Taylor & Zafman LLP (57) ABSTRACT

The present invention provides systems and methods for improving overall profitability, and/or longevity of one or more businesses within an industry, by analyzing their position(s) within one or more market segment. In doing so, it is contemplated that the systems or methods may include managing sales (e.g. competition and/or volume, or otherwise) within one or more market segments of an industry. Of the many available applications, the present invention may be particularly suited for the automotive industry, or other similar types of industries.

20 Claims, 10 Drawing Sheets

Company Exit Targets Italy 2007

| Regional Price Class Segment | Vehicle(s) | Herfindahl Volume | Market Share | Plant Capacity Impact |
|---|---|---|---|---|
| E Full - Size Car - Premium | Vehicle #1 | 11234 | 2% | Plant Name Capacity Delta |
| Mid - Size - SUV - Premium | Vehicle #2 Vehicle #3 | 5522 2223 | 2.2% 3.3% | Princeton #1 77% - 73%(4%) |
| F Specialty Car | Vehicle #4 | 2513 | 1% | Princeton #2 105% - 98%(7) |
| C Compace MPV | Vehicle #5 | 2345 | 1% | Princeton #2 105% - 98%(7) |
| B Small Coupe & Roadster | Vehicle #6 | 1944 | 1% | Princeton #2 105% - 98%(7) |
| Large Panel Van | Vehicle #7 | 1236 | 1% | Princeton #2 105% - 98%(7) |

Fig-19 ically tested, to determine how the specific segments may improve or digress, over time, given a change in products and/or services offered. In determining performance of the specific segments, potential changes may be considered to improve profit margins and/or sales revenue or the specific segments, brands and/or parent companies of the brands.

MANAGING SALES AND/OR COMPETITION WITHIN AN INDUSTRY

FIELD OF THE INVENTION

The present invention provides systems and methods for giving businesses the ability to manage sales (e.g. competition and/or volume, or otherwise) within an industry, such as the automotive vehicle industry or otherwise.

BACKGROUND OF THE INVENTION

In a broad scope, the Hershman-Herfindahl Index (HHI) has been used to statistically gauge the overall level of competition level of various industries over an entire economy, for a given region or otherwise.

However, in contrast, many businesses within an industry (e.g. manufacturing, sales, or otherwise) use extensive research, which is generally time consuming, to acquire data regarding the existing competition within its industry and their overall exposure to that competition. In doing so, economists are often used to conduct such research and use various modeling techniques and calculations to measure and forecast the competition of the particular business within that industry.

In view of the extensive research time and cost, there exists a need for a cost effective and potentially more accurate system and/or method to allow individual businesses to analyze their competition level, and optionally their sales volume, of one or more product or services, or all products or services, within that industry and/or within market segments of the industry. In doing so, business or brand manufactures and/or parent companies (or otherwise) may use this analysis to improve profit margins and/or sales revenue by discontinuing underperforming products, product brands, and/or services and initiating manufacture of new products, product brands, and/or services that may be more profitable. This may reflect positively on the brand manufacture and/or parent company within the specific industry.

In one example, within the automotive industry, it may be desired to analyze one or more market segments (e.g. brand manufacturers, parent companies of brand manufactures, vehicle types or otherwise) to determine how a specific segment (e.g. a specific brand manufacturer, parent company of the brand manufacture, vehicle type) compares to other specific segments of the same company and/or competitors. This may be achieved, through the present invention, by comparing the competition and/or sales volume of the specific segments. Based on the performance of the specific segments, strategies can be formulated, and hypothetically tested, to determine how the specific segments may improve or digress, over time, given a change in products and/or services offered. In determining performance of the specific segments, potential changes may be considered to improve profit margins and/or sales revenue or the specific segments, brands and/or parent companies of the brands.

In view of the foregoing, it is an object of the present invention to provide improved and/or cost effective methods and systems for allowing businesses to improve their overall profitability, and/or longevity within an industry, by analyzing their position within one or more market segment.

SUMMARY

The present invention provides systems and methods for improving overall profitability, and/or longevity of one or more businesses within an industry, by analyzing their position(s) within one or more market segment. In doing so, it is contemplated that the systems or methods may include managing sales (e.g. competition and/or volume, or otherwise) within one or more market segments of an industry. Of the many available applications, the present invention may be particularly suited for the automotive industry, or other similar types of industries.

In one aspect, the present invention provides a system for facilitating in comparison with market segments. The system generally includes a storage and computational device, referred generally as a computer hereforward, for performing necessary calculations for comparing the different market segments and generating any associated table, chart, diagram or otherwise. Suitable programs may include Eviews, Microsoft Access, or other programs suitable for calculating the Hershman-Herfindahl Index (HHI) measurement, responding to user input and accessing stored data. Typically, the computer includes a suitable program for effectuating the calculation, formulas or otherwise. Such suitable programs may include any windows based operation system or program, DOS, Unix, Visual Basic, Mac operating System, or otherwise. Suitable platforms that may be used include, without limitation, HTML, XML, JAVA, other Internet, or non-Internet based programs. In any configurations, preferably, the program is configured for providing the ability to enter and retrieve information pertaining to the market segment.

In another aspect, the present invention provides a method employed by the system in managing sales competition within a market segment comprising the steps of: determining sales competition within a market segment of an industry by determining an estimated sales volume measurement, a Herfindahl Index measurement, or both for one or more segments of various product types or brands offered for sale within the market segment; based upon the determination of the sales competition: i) formulate a first representation of one or more segments a business already competes in; ii) formulate a second representation of one or more segments the business does not currently compete in, or both; selecting at least one of the one or more segments the business already competes in, at least one of the one or more segments the business does not currently compete in, or both; and based upon the selected segments: i) decrease or eliminate product types or brands previously offered for sale by the business; ii) offer for sale products types or brands which the business is not currently selling, or both.

It should be appreciated that the above referenced aspects and example are non-limiting as other exists with the present invention as shown and described herein. Still further, it should be appreciated that the above referenced aspects and examples of the invention may be combined to form other unique configurations, as demonstrated in the drawings, described herein, or otherwise.

BRIEF DESCRIPTION OF THE DRAWINGS

The features and inventive aspects of the present invention will become more apparent upon reading the following detailed description, claims and drawings, of which the following is a brief description:

FIG. 5 illustrates an exemplary first chart illustrating one or more segments within the market segment a business already competes in;

FIG. 7 illustrates an exemplary table illustrating a list of information relating respectively to one or more segments a business already competes in;

FIG. 9 illustrates an exemplary second chart illustrating one or more segments within the market segment the business does not currently compete in;

FIG. 11 illustrates an exemplary table illustrating a list of information relating respectively to one or more segments a business does not currently compete in;

DETAILED DESCRIPTION

As a general introduction, the present invention provides systems and methods for improving overall profitability, and/or longevity of one or more businesses, within an industry, by analyzing their position(s) within one or more market segments. In doing so, it is contemplated that the systems or methods may include managing sales (e.g. competition and/or volume, or otherwise) within one or more market segments of an industry. This may include analyzing business performance within the market segments and making alterations to the business, through addition, deletion or alteration of certain business brands, products, services, or otherwise to improve the overall performance (e.g. profitability) of the business.

In one configuration, this is achieved by assessing the competition environment (e.g. sales competition and/or volume, or otherwise) of one or more businesses or business products or services within a market segment of an industry. This may include the formulation of a chart and/or table demonstrating estimated sales volume measurement as it relates to the competition level. In one preferred configuration, the competition level may be determined through use of the Hershman-Herfindahl Index (HHI) formula to measure the competition level of a business (or product developed or sold thereby). Optionally, the charts and/or table may include numerous businesses, products, services or otherwise, of the business (or parent company) and/or competition thereto.

The market segments within an industry may comprise of any portion of an industry through which segmented analysis is desired to analyze performance within the industry. This may include businesses, parent or children businesses thereof. This may also include products, services, combinations thereof or otherwise. This may also include brands, trademarks, service marks, logos or other distinguishing marks or indicia, or otherwise. Other market segments should be appreciated and are within the scope of the present invention. Analysis of the market segments may be performed for the entire global economy or within one or more geographic locations.

In one example, the market segment may comprise specific product brands offered for sale within a specified region. In this market segment, competitive or non-competitive brands (e.g. sister companies or otherwise) may be compared to determine how the brands competitively match up. As previously mentioned, this may be in regards to competition of the brand, sales volume of the brand, combinations thereof or otherwise. In one particularly unique configuration, a comparison is made, arranged and displayed on a chart, graph, table or other viewable media demonstrating how the brands compare.

In this regards the competition and sales volume are correlated to display preferred regions within the chart or otherwise. For example, certain regions may include low competition/high sales volume. In contrast, this may include high competition/low sales volume. Of course there exists low competition/low sales volume and high competition/high sales volume. As may be appreciated, in certain respects a desired region may comprise of low competition/high sales volume. This is because it is contemplated that higher profit margins may be realized from the high demand and low competition. In contrast, a lower profit margin may result in a saturated market of high competition/low volume area of the market.

Once this analysis is performed, the present invention provides the ability to alter the brands, products, services, or otherwise, offered by removing less desirable brands, products, services, or otherwise, and/or introducing more desirable brands, products, services, or otherwise. As should be appreciated, this may result in a more competitive business.

In a specific example, within the vehicle industry and more specifically the automotive vehicle industry, it is contemplated that the market segment may comprise automotive brands made available for sale. Such brands may include foreign and/or domestic vehicles for the given region (e.g. continent, country, state, or other unified bodies such as the European Union or otherwise). Of the many automotive vehicle brands, such brands may include Chevrolet, Pontiac, Ford, Jeep, Chrysler, Dodge, Audi, Toyota, Volkswagen, BMW, etc. It is also contemplated that the parent company of brands may also or alternatively be considered. Accordingly, such companies such as General Motors, Ford, Daimler-Chrysler, Toyota, etc., can be competitively compared. As should be appreciated, other non-automotive vehicle analysis, or non-vehicle analysis may be performed.

Upon completion of analysis, it is determined that one or more of the brands or parent companies are not in a desired range of competition and/or sales, modification can be made of available products to improve profitability, particularly over a time period. Within the automotive industry, such particular changes can be made to the vehicle type offered for sale within a brand, automotive manufacturer, or parent company thereof.

Examples of vehicle types that may be presented within a market segment may include, without limitations: a mini car, b small car, b small coupe & roadster, b small multi-purpose vehicle (mpv), c compact car, c compact car premium, c compact car premium, c compact coupe & roadster, c compact mpv, cdv compact van, compact sports utility vehicle (suv), d mid-size car premium, d mid-size couple & roadster, d mid-size mpv, e full-size car, e full-size car premium, e full-size coupe & roadster, f luxury car, f specialty car, large panel van, mid-size suv, mid-size premium, pickup, small panel van, small suv, etc.

In one particularly unique aspect, the present invention is predicated upon providing a system and method to clients for allowing the clients to manage sales competition within their industry. Such sales competition may be over a select time period and in one or more geographic locations. The system allows the clients to determine sales competition within a market segment of their industry. In one example, an estimated sales volume measurement (i.e. number of vehicles sold) and an HHI Index measurement (measure of the level of competition that exists within each segment) are determined for each segment (e.g. manufacture or business, product brand, product type, or otherwise) of the market segment.

Upon analysis, a first chart, table or otherwise may be formulated to show how the particular segment compares to other segments (either by the same business, a competitor, or both) within the market segment of the industry. This first chart may be referred to as a chart of exit segments showing where the business already competes. As previously mentioned, it is contemplated that some segments may be located in advantageous market regions (e.g. high sales volume/low competition) and some may be in disadvantageous market regions (e.g. low sales volume/high competition), or otherwise.

Based upon the first analysis of where the business competes (i.e. target exit points), a second chart, table or otherwise, may be formulated illustrating one or more, and preferably a plurality of target entry segments where the business is not competing in. As with the first chart, it is contemplated that some segments may be located in advantageous market regions (e.g. high sales volume/low competition) and some may be in disadvantageous market regions (e.g. low sales volume/high competition), or otherwise.

With the first and second charts, illustrating target exit and entry points or segments, respectively, the user may select one or more target exit points or segments which the business no longer wishes to compete and/or one or more target entry points or segments which the business now wishes to compete in. In doing so, a new chart may be illustrated, preferably based upon a business, business brand, parent company, or otherwise, that shows the effect of this change over a selected time period. This new chart may show the business, parent company, or otherwise, moving within a chart to a more competitive position, with respect to competition level and sales volume.

In one preferred configuration, the present invention includes a system for facilitating in comparison with market segments. The system generally includes a storage and computational device, referred generally as a computer hereforward, for performing necessary calculations for comparing the different market segments and generating any associated table, chart, diagram or otherwise. Suitable programs may include Eviews, Microsoft Access, or other programs suitable for calculating the Hershman-Herfindahl Index (HHI) measurement, responding to user input and accessing stored data. Typically, the computer includes a suitable program for effectuating the calculation, formulas or otherwise. Such suitable program may include any windows based operation system or program, DOS, Unix, Visual Basic, Mac operating System, or otherwise. Suitable platforms that may be used include, without limitation, HTML, XML, JAVA, other Internet, or non-Internet based programs. In any configurations, preferably, the program is configured for providing the ability to enter and retrieve information pertaining to the market segment.

Preferably, the system includes a user interface for interacting with the computer. The user interface may be located with the computer or remotely such as through a network (e.g., hard network or wireless network). It is contemplated that the network may comprise the Internet, wherein a user accesses the computer through a personal or work computer. In this configuration, the user interface may comprise, at least in part, the user's computer or work station.

In a preferred configuration, the system further includes one or more storages device for receiving and storage related to market information pertaining to a users business, product or otherwise. The storage device may be located with the computer or remotely. Preferably, the storage device(s) are configured for receiving additional information or for modification of existing data such that the system is configured for continual updating to insure the user is assured of the most recent market information.

As previously mentioned, the present invention is configured for determining the sales competition within a market segment. In one particularly preferred configuration, the competition the market segment is determined using the Hershman-Herfindahl Index (HHI). The HHI measurement is a measure of the level of competition that exists for a specific segment within the market segment.

The HHI of a specific segment is an estimated measure of the level of competition existing within the specific segment. The HHI for a specific segment within the market segment is computed using equation (1):

$$HHI = \sqrt{\sum_{n=1}^{N} (marketshare)^2} \qquad (1)$$

As shown in equation (1), the HHI for a specific segment within the market segment is computed by taking the square root of the sum of the squared market shares of all the businesses competing within the specific segment of the market segment. The market share is computed using equation (2):

$$MarketShare = \left(\frac{V_n}{V} * 100\right) \qquad (2)$$

In equation (1) and (2), $V_n$ is the total sales of products or otherwise of the specific segment from a business, V is the total sales of products or otherwise of the specific segment, and N is the total number of businesses competing in the specific segment.

In one example, referring to the automotive business, if businesses such as Ford, General Motors, and Toyota compete in a vehicle type such as pickup trucks, where Ford has a total sales of 10 pickup trucks, General Motors has a total sales of 40 pickup trucks, and Toyota has a total sales of 50 pickup trucks, then the market share of Ford is 10, the markets share of General Motors is 40, and the market share of Toyota is 50 according to equation 2. In this example, the HHI for pickup trucks would be approximately 64.8 according to equation 1.

Generally, a specific segment within the market segment with a high HHI means there is exists low competition within the specific segment, which tends to lead to wider profit margins. In contrast, a specific segment with a low HHI means there is exists a saturation of competition within the specific segment, which tends to lead to slimmer profit margins.

The estimated sales volume measurement for a specific segment is the estimated number of products or otherwise sold for the specific segment. In one example, if the specific segment is a vehicle type, such as a mini car, then the sales volume measurement for this specific segment would be the estimated number of vehicles sold considered being a mini car.

Referring to the drawings, certain aspects of the present invention are shown directed to the automotive industry. However, it should be appreciated that the drawings are for exemplary purposes only and should not be considered as limiting. The drawings are merely to illustrate the systems and methods described above.

Figure 1:
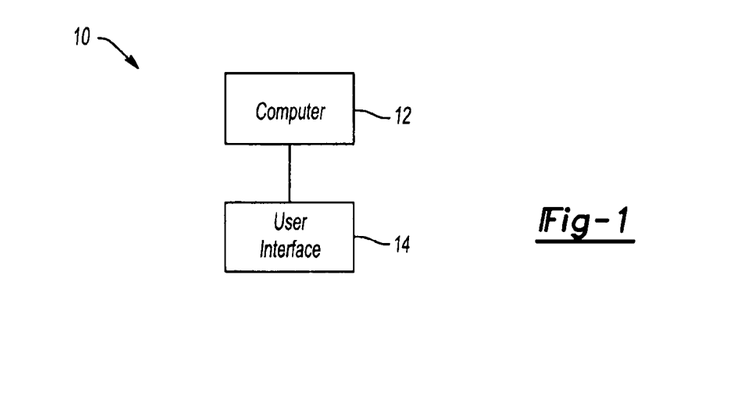
FIG. 1 illustrates a schematic diagram of a system in accordance with an aspect of the present invention.

Referring to FIG. 1, there is illustrated a schematic diagram of one preferred configuration of a system in accordance with the present invention. As can be seen, the system generally includes a computer 12 and a user interface 14 interacting with the computer 12. The computer 12 functions as a storage and computational device for performing necessary calculations for comparing the different specific segments (e.g. specific brand manufacturer, parent company of the brand manufacturer, vehicle type or otherwise) within the market segment (e.g brand manufacturers, parent companies of brand manufacturers, vehicle types or otherwise). The computer 12 includes a program, such as Eviews, Microsoft Access, or other suitable programs for calculating the HHI, responding to user input and accessing stored data (e.g. sales volume). The computer 12 also includes a suitable program for effectuating the calculation, formulas or otherwise. Such suitable programs may include any windows based operation system or program, DOS, Unix, Visual Basic, Mac operating system, or otherwise. Suitable platforms that may be used include, without limitation, HTML, XML, JAVA, other Internet, or non-Internet based programs. In any configuration, the program is configured for providing the ability to enter and retrieve information pertaining to the market segment. Also, configured for formulating, arranging, and displaying on a chart, graph, table or other viewable media demonstrating how the specific segments compare within the market segment.

As previously discussed, the user interface 14 may be located with the computer 12 or remotely such as through a network (e.g., hard network or wireless network). It is contemplated that the network may comprise the Internet, wherein a user accesses the computer 12 through a personal or work computer (not shown). In this configuration, the user interface 14 may comprise, at least in part, the user's computer or work station. In this configuration, the user interface 14 is configured for displaying the formulated charts, graphs, tables, or other viewable media demonstrating how the segments compare.

The system further includes one or more storage devices (not shown) for receiving and storing related to market information pertaining to a user's business, product, or otherwise. The storage device may be located with the computer 12 or remotely. Preferably, the storage device(s) are configured for receiving additional information or for modification of existing data such that the system 10 is configured for continual updating. This insures that the user is receiving the most recent market information.

A method is employed with the system in managing sales and/or competition within one or more market segments. One preferred method employed comprises the steps of: determining sales competition within a market segment of an industry by determining an estimated sales volume measurement, a Herfindahl Index measurement, or both for one or more segments of various product types or brands offered for sale within the market segment; based upon the determination of the sales competition: i) formulate a first representation of one or more segments a business already competes in; ii) formulate a second representation of one or more segments the business does not currently compete in, or both; selecting at least one of the one or more segments the business already competes in, at least one of the one or more segments the business does not currently compete in, or both; and based upon the selected segments: i) decrease or eliminate product types or brands previously offered for sale by the business; ii) offer for sale products types or brands which the business is not currently selling, or both.

Figure 2:
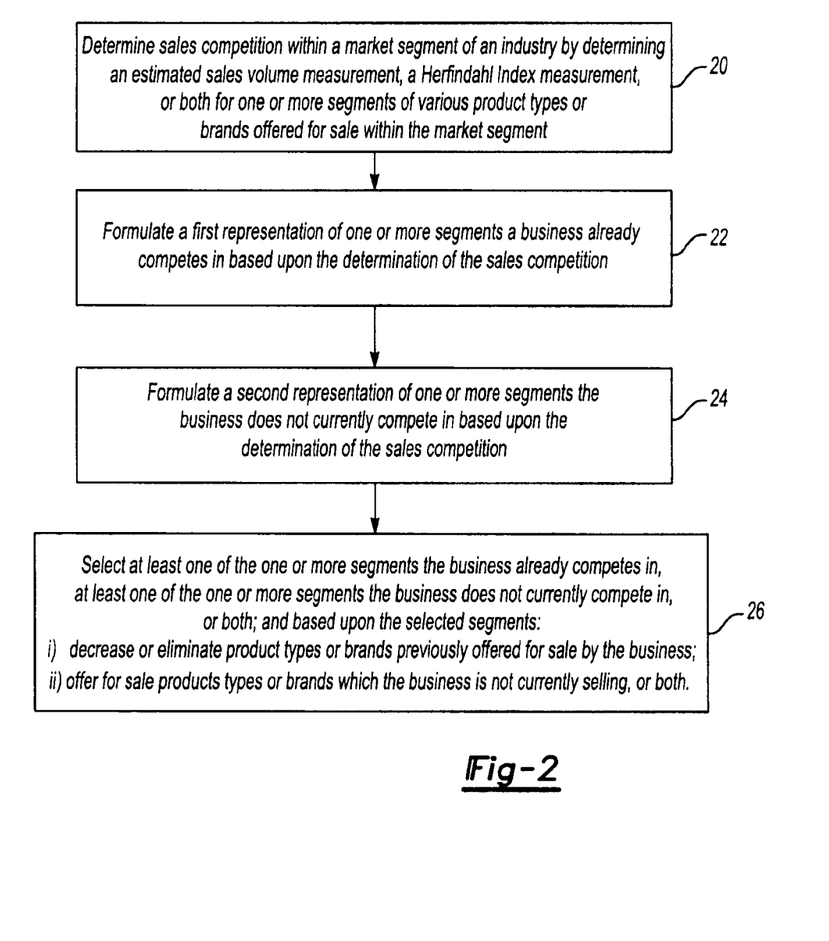
FIG. 2 illustrates a flowchart showing functional a method in accordance with an aspect of the present invention.

FIG. 2 illustrates a flowchart of these steps of the one preferred method. In step 20, determine sales competition within a market segment of an industry by determining an estimated sales volume measurement, a Herfindahl Index measurement, or both for one or more segments of various product types or brands offered for sale within the market segment; based upon the determination of the sales competition. In step 22, formulate a first representation of one or more segments a business already competes in based upon the determination of the sales competition. In step 24, formulate a second representation of one or more segments the business does not currently compete in based upon the determination of the sales competition. In step 26, select at least one of the one or more segments the business already competes in, at least one of the one or more segments the business does not currently compete in, or both; and based upon the selected segments: i) decrease or eliminate product types or brands previously offered for sale by the business; ii) offer for sale products types or brands which the business is not currently selling, or both.

Figure 3:
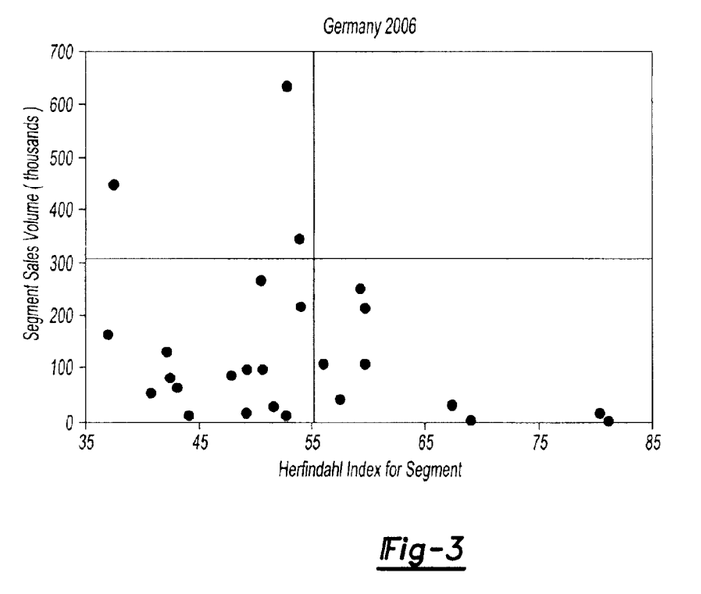
FIG. 3 illustrates an exemplary chart illustrating sales and/or competition of specific segments in a market segment.

In one preferred configuration, a chart, table, list, or otherwise can be formulated illustrating the sales and/or competition of one or more segments of various product types or brands offered for sale within the market segment over a select time period and in one or more geographic locations before the user makes any selections. FIG. 3 illustrates an exemplary chart illustrating the sales and/or competition of one or segments in a market segment over a select time period and in one or more geographic location. In this example as shown in FIG. 3, the sales competition within a market segment is evaluated for year 2006 in Germany. In this example, each dot represents a specific segment of a product type or brand offered for sale, such as a vehicle type, within the market segment. The market segment in this example is vehicle types. As shown, each vehicle type is positioned in the chart according its respective HHI and sales measurement. In this chart, the x-axis represents the HHI value and the y-axis represents the sales. This chart allows the user to quickly compare a particular vehicle type to another or other vehicle types within the market segment of the industry.

Figure 4:
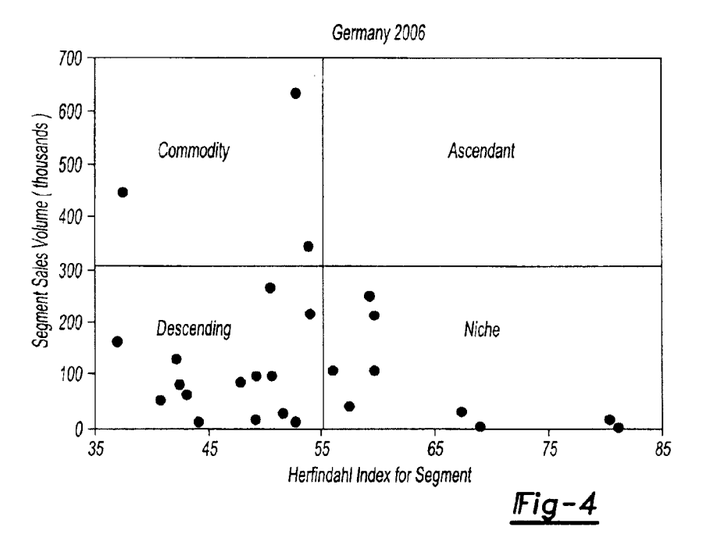
FIG. 4 illustrates an exemplary chart divided into one or more regions.

The chart or any other graphical representation used to illustrate the segments can be divided into one or more regions, showing that some segments may be located in advantageous market regions (e.g. low competition/high sales volume), some may be in disadvantageous market regions (e.g. high competition/low sales volume), and some may be in market regions that have a low competition and low sales volume or high competition and high sales volume. FIG.

4 illustrates an exemplary chart being divided into one or more regions. In this example, as shown in FIG. 4, the chart is divided into four regions. Specific segments with low sales volume and high HHI or low competition are within a niche region. Specific segments with high sales volume and low HHI or low high competition are within a commodity region. Specific segments with low sales volume and low HHI or high competition are within a descending region. Specific segments with high sales volume and high HHI or low competition are within an ascendant region, which in most cases is the most preferred region.

Classifying the segments within the market segment on the graphical representation, such as the as described above allows users to identify, at a glance, specific segments that exhibit a desirable combination of high sales volume and low level of competition. Moreover, the user is provided an overview as to where each of the segments it is competing in is positioned within the chart with respect to each other or other segments it is not competing in.

As for step 22, formulating a first representation of one or more segments a business already competes in based upon the determination of the sales competition provides the user a quick overview of one or more segments of various product types or brands offered for sale within the market segment a business is already competing in.

Figure 5:
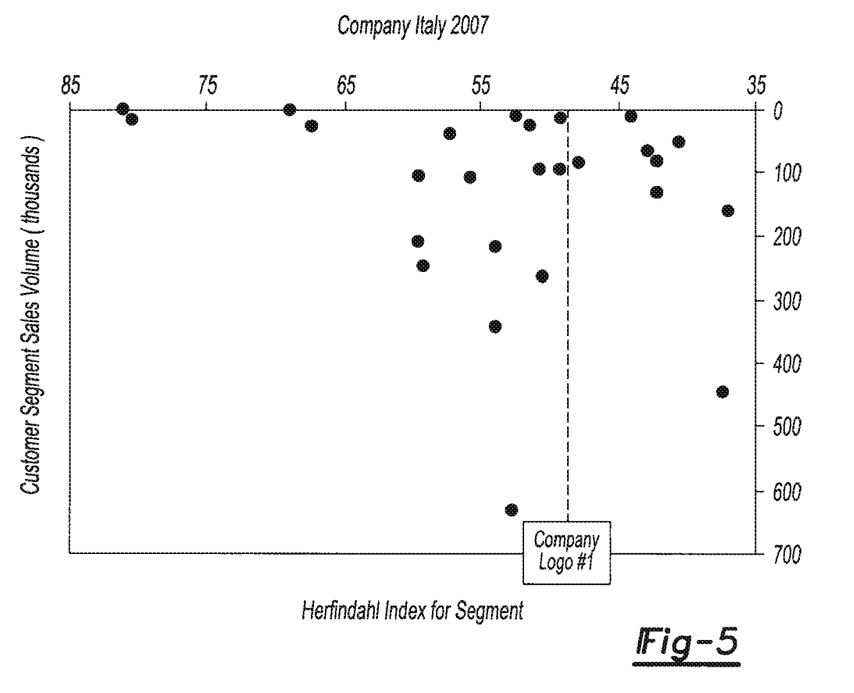
Figure 6:
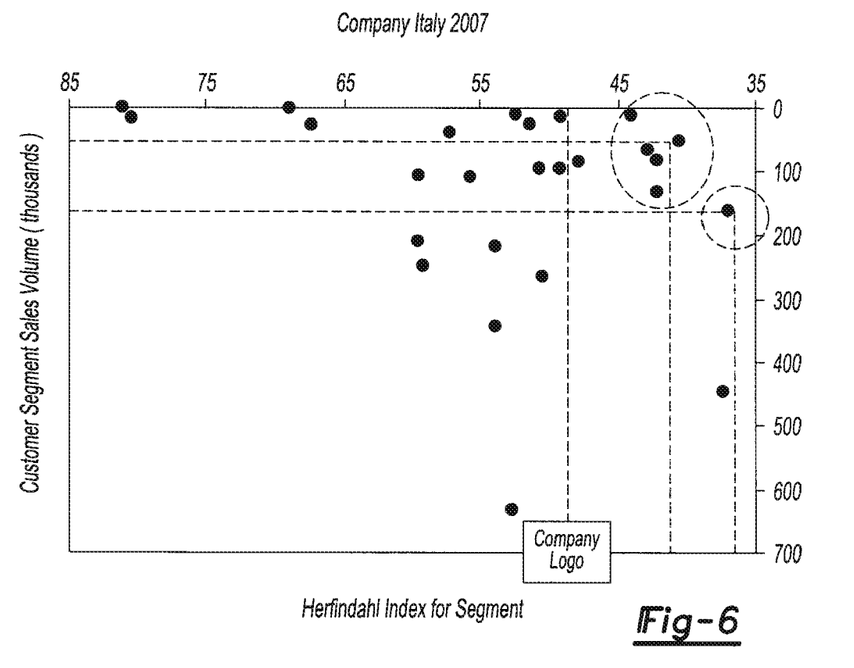
FIG. 6 illustrates an exemplary first chart having the most disadvantageous segments circled.

One exemplary first representation is illustrated in FIGS. 5 and 6 as a chart. Specifically, FIG. 5 is an exemplary chart illustrating one or more segments of various product types or brands offered for sale within the market segment a business already competes in. In this example, as shown in FIG. 5, the chart illustrates one or more segments of various product types or brands offered for sale within the market segment Toyota already competes in for the year 2007 in Italy. As shown, each dot in this exemplary chart represents a segment of a product type or brand offered for sale, such as a vehicle type, within the market segment Toyota already competes in. The market segment in this example is vehicle types. Each segment Toyota already competes in is positioned in the chart according to its respective HHI and sales measurement. However, in this chart, the x-axis and y-axis are flipped such that HHI increases from left to right of the chart and the volume sales increase from top to bottom of the chart. It should be understood that the chart can be formulated for any selected time or time period and in one or more geographic locations. It should also be understood that other representations can be used such as a table or otherwise.

Figure 7:
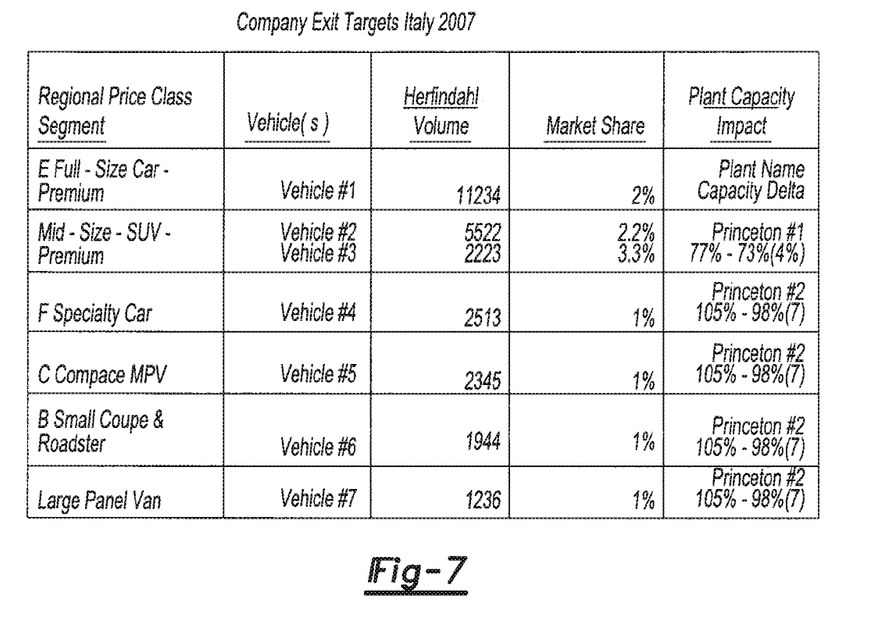

It is contemplated that the most disadvantageous segments of various product types or brands offered for sale within the market segment the business already competes in or segments of various product types or brands offered for sale within the market segment the business already competes in that exhibit low volume sales and/or low HHI can be circled or highlighted on the chart or another formulated chart. The most disadvantageous segments may be referred to as exit segments. FIG. 6 is an exemplary first chart having the most disadvantages segments the business competes in circled. This will quickly direct the user to the most disadvantageous segments the business already competes in. Alternatively, or in combination, a list, table or otherwise may be formulated to present the most disadvantageous segments the business already competes in. For example, the most disadvantageous segments the business already competes in may be presented on a list in an order based on the HHI and/or sales volume of each segment. The list may also include information pertaining to each respective disadvantageous segment the business already competes in. Information that may be illustrated on the list, include without limitation, the product(s) or otherwise sold under the segment, the HHI volume (product of volume sales and HHI), the market share, and the plant capacity impact (e.g. impact in plant capacity when the business no longer competes one of the identified disadvantageous segment) of each disadvantageous segment the business already competes in. FIG. 7 illustrates an exemplary table illustrating a list of information relating respectively to one or more segments the business already competes in.

Figure 8:
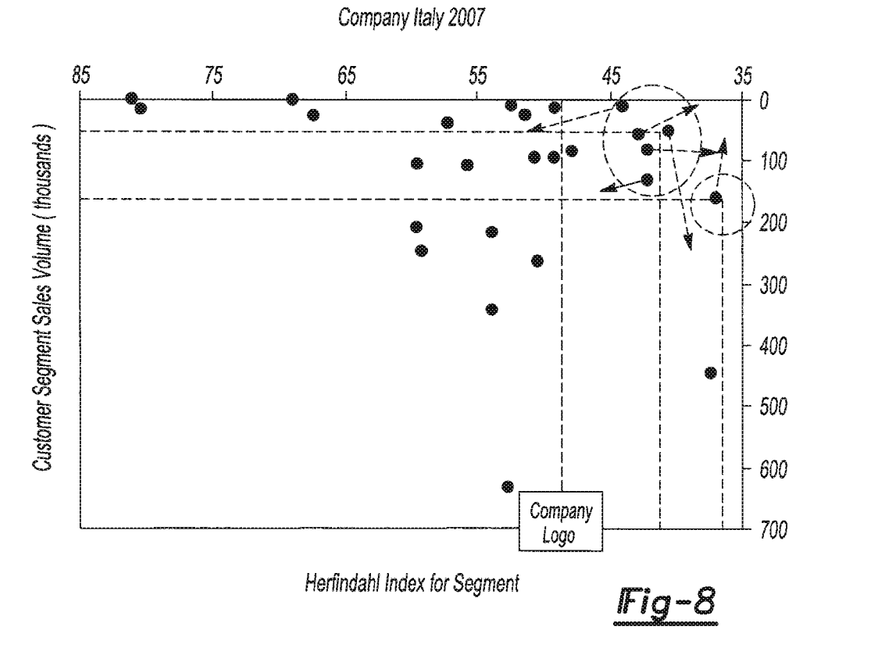
FIG. 8 illustrates an exemplary chart illustrating the movement in the sales and/or competition of the disadvantageous segments in the first chart from 2009-2012.

It is also contemplated that another graphical representation, such as a chart may be formulated illustrating the movement of one or more segments of various product types or brands offered for sale within the market segment the business already competes in or only one or more of the disadvantageous segments the business already competes in over a period of time and in one or more geographic locations. FIG. 8 illustrates an exemplary chart illustrating the movement or changes in the sales and/or competition of the disadvantageous segments the business already competes in from 2009-2012. As such, the user can forecast the performance of each segment of various product types or brands offered for sale within the market segment the business is already competing in over a period of time.

Figure 9:
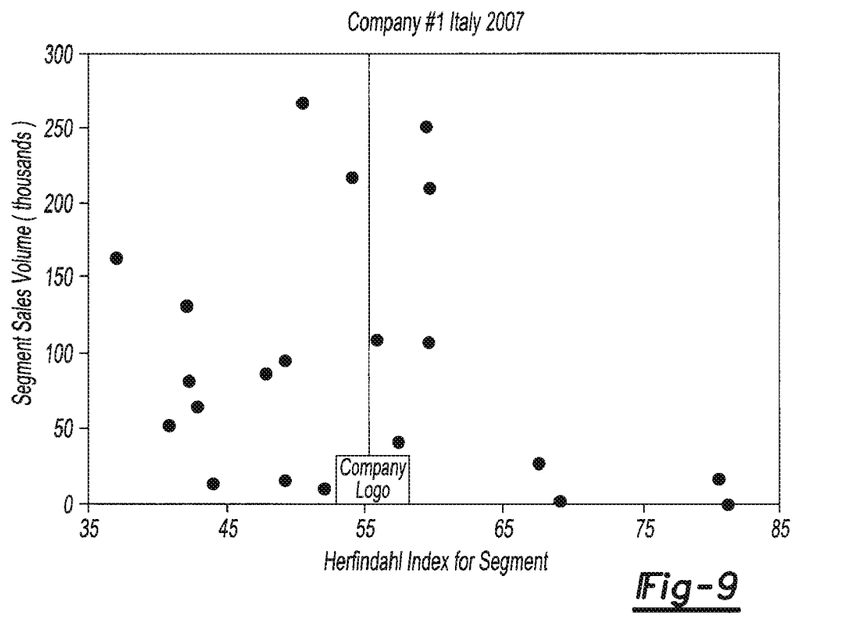
Figure 10:
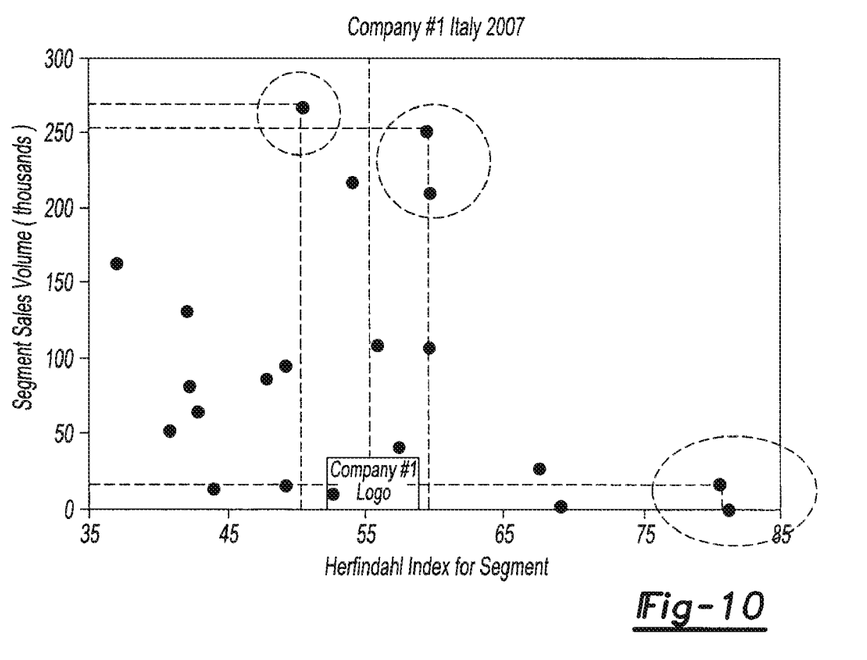
FIG. 10 illustrates an exemplary second chart having the most disadvantageous segments circled.

As for step 24, formulating a second representation of one or more segments the business does not currently compete in based upon the determination of the sales competition provides the user a quick overview of one or more segments of various product types or brands offered for sale within the market segment the business does not currently compete in. One exemplary second representation is illustrated in FIGS. 9-10 as a chart. Specifically, FIG. 9 is an exemplary chart illustrating one or more segments of various product types or brands offered for sale within the market segment the business is not currently competing in. In this example, as shown in FIG. 9, the chart illustrates one or more segments of various product types or brands offered for sale within the market segment Toyota does not currently compete in for the year 2007 in Italy. As shown, each dot in this exemplary chart represents a segment of a product type or brand offered for sale, such as a vehicle type, within the market segment the business does not currently compete in. The market segment in this example is vehicle types. Each segment Toyota does not currently compete in is positioned in the chart according to its respective HHI and sales measurement. However, in this chart, the x-axis and y-axis are flipped such that HHI increases from right to left and the volume sales increase from bottom to op of the chart. It should be understood that the chart can formulated for any selected time or time period and in one or more geographic locations. It should also be understood that other representations can be used such as a table or otherwise.

It should be understood that x-axis and the y-axis of the charts described above can be positioned in a combination of ways and should not be limited to the manner described in the examples above.

Figure 11:
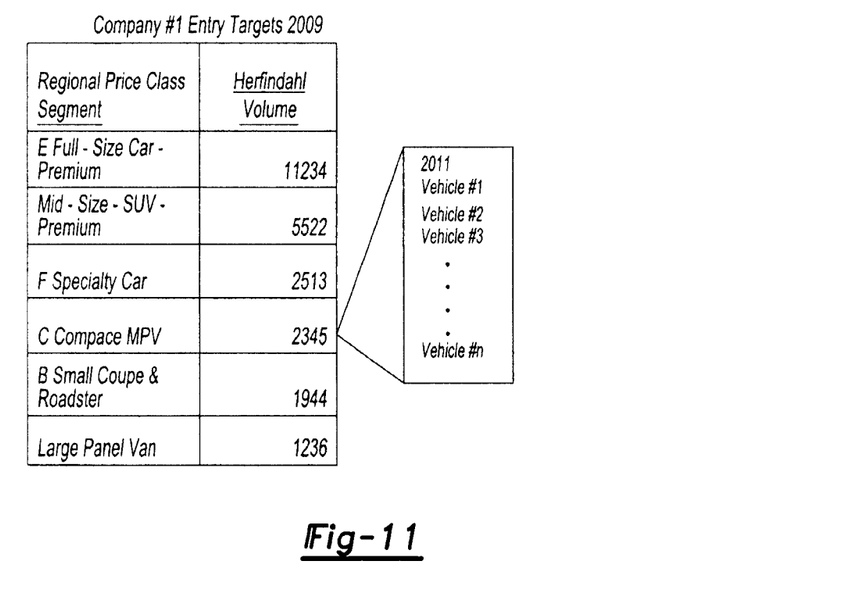

It is contemplated that the most advantageous segments of various product types or brands offered for sale within the market segment the business does not currently compete in or segments of various product types or brands offered for sale within the market segment the business does not currently compete in that exhibit high volume sales and/or high HHI can be circled or highlighted on the chart or another formulated chart. These most advantageous segments may be referred to as entry segments. FIG. 10 is an exemplary chart having the most advantageous segments the business does not currently compete in circled. This will quickly direct the user to the most advantageous segments the business does not currently compete in. Alternatively, or in combination, a list, table or otherwise may be formulated to present the most advantageous segments the business does not currently compete in. For example, the most advantageous segments the business does not currently compete in may be presented on a list in an order based on the HHI and/or sales volume of each segment. The list may also include information pertaining to each respective advantageous segment the business does not currently compete in. Information that may be illustrated on the list, include without limitation, the HHI volume (product of volume sales and HHI), the HHI, and sales volume of each advantageous segment the business does not currently compete in. FIG. 11 illustrates an exemplary table illustrating a list of information relating respectively to one or more segments the business does not currently compete in.

Figure 12:
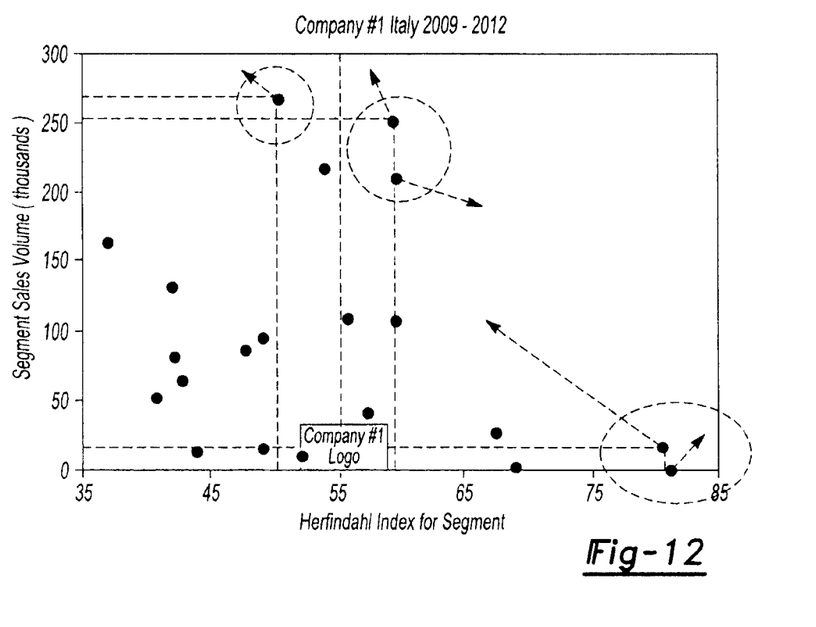
FIG. 12 illustrates an exemplary chart illustrating the movement in the sales and/or competition of the advantageous segments in the first second chart from 2009-2012.

It is also contemplated that another graphical representation, such as a chart may be formulated illustrating the movement of one or more segments of various product types or brands offered for sale within the market segment the business does not currently compete in or only one or more of the advantageous segments the business does not currently compete in over a period of time and in one or more geographic locations. FIG. 12 illustrates an exemplary chart illustrating the movement or changes of the advantageous segments the business does not currently compete in from 2009-2012. As such, the user can forecast the performance of each segment of various product types or brands offered for sale within the market segment the business does not currently compete in over a period of time.

As for step 26, selecting at least one of the one or more segments the business already competes in, at least one of the one or more segments the business does not currently compete in, or both; and based upon the selected segments: i) decrease or eliminate product types or brands previously offered for sale by the business; ii) offer for sale products types or brands which the business is not currently selling, or both can assist the user in managing sales competition with the market segment. For example, the user can remove products, brands, services, or otherwise in segments the business is already competing in and/or introduce more desirable brands, products, services, or otherwise in segments the business does not currently compete in. As a result, the sales and/or competition of one or more of the segments within the market segment may change or be impacted by the change.

It is contemplated that a third graphical representation, such as a chart, can be formulated illustrating the change in sales and/or competition of one or more segments of various product types or brands in the market segment based upon removing products, brands, services or otherwise in segments the business is already competing in and/or introducing more desirable brands, products, services, or otherwise in segments the business does not currently compete in. This will provides the user an overview of the where one or more of the segments of various product types or brands offered for sale within the market segment will be positioned with respect to competition level and/or sales volume if, for example, the business no longer competes in one or more segments the business is already competing in and/or if the business competes in one or more segments the business does not currently compete in.

Figure 13:
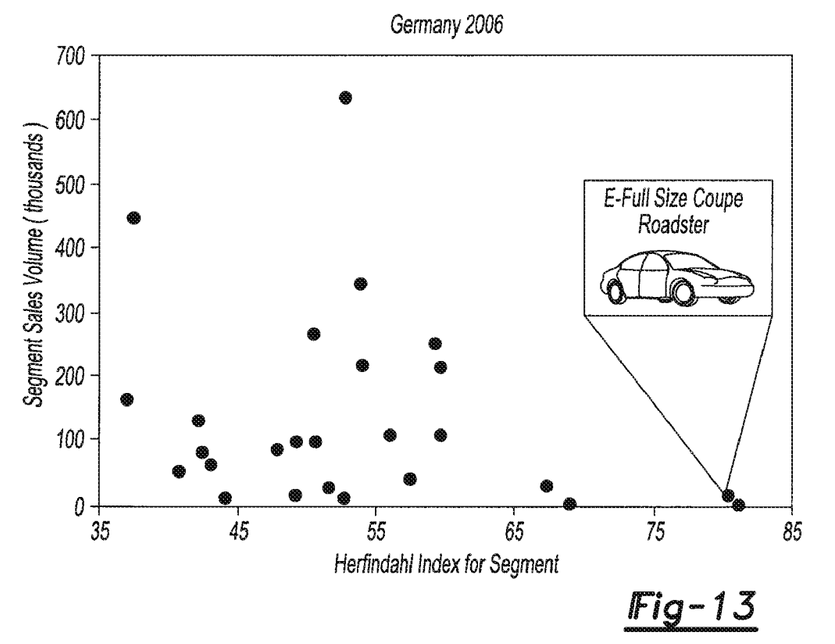
FIG. 13 illustrates an example of information being illustrated within an exemplary chart.
Figure 14:
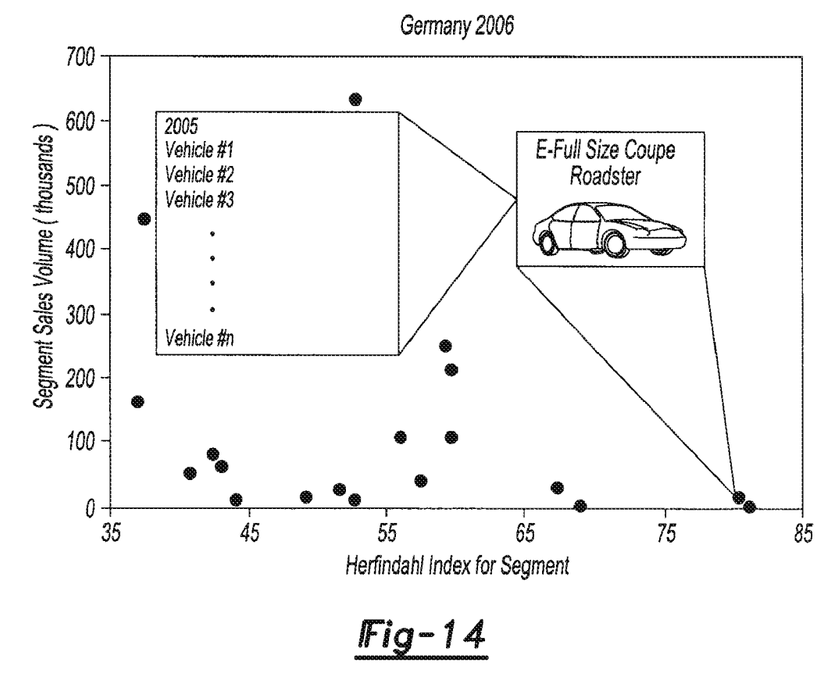
FIG. 14 illustrates another example of information being illustrated within an exemplary chart.

In one or more of the graphical representations (e.g. charts) discussed above, information pertaining to each of the segments may be illustrated in the respective graphical representation by simply placing a mouse over the segment of interest in the graphical representation. This may also be done through the use of a stylus, keyboard, a command bottom illustrated on the graphical representation, or otherwise. FIG. 13 illustrates an example of information being illustrated within an exemplary chart. In this example, the vehicle type represented by the dot is illustrated in a graphic when the user places the mouse over the dot. FIG. 14 illustrates another example of information being illustrated within an exemplary chart. In this other example; however, the vehicle type represented by the dot is illustrated along with the vehicles sold under the vehicle type as another graphic. This can be done when the user places the mouse over the dot or over the vehicle type graphic.

In one or more of the graphical representations (e.g. charts) discussed above, the average HHI and/or sales volume within the market segment may be illustrated in each respective chart by one or more graphics, such as, a line, logo, dot, or otherwise. For example, as illustrated in FIG. 8, the average HHI in the market segment is illustrated by a vertical line and a company logo.

Upon completion of the above analysis, it is contemplated that a parent company chart and/or a brand chart can be formulated illustrating how a specific parent company or brand compares to other parent companies or brands respectively. Specifically, the market segmentation analysis described above will effectuate the volume sales and/or HHI of parent companies and brands.

Figure 15:
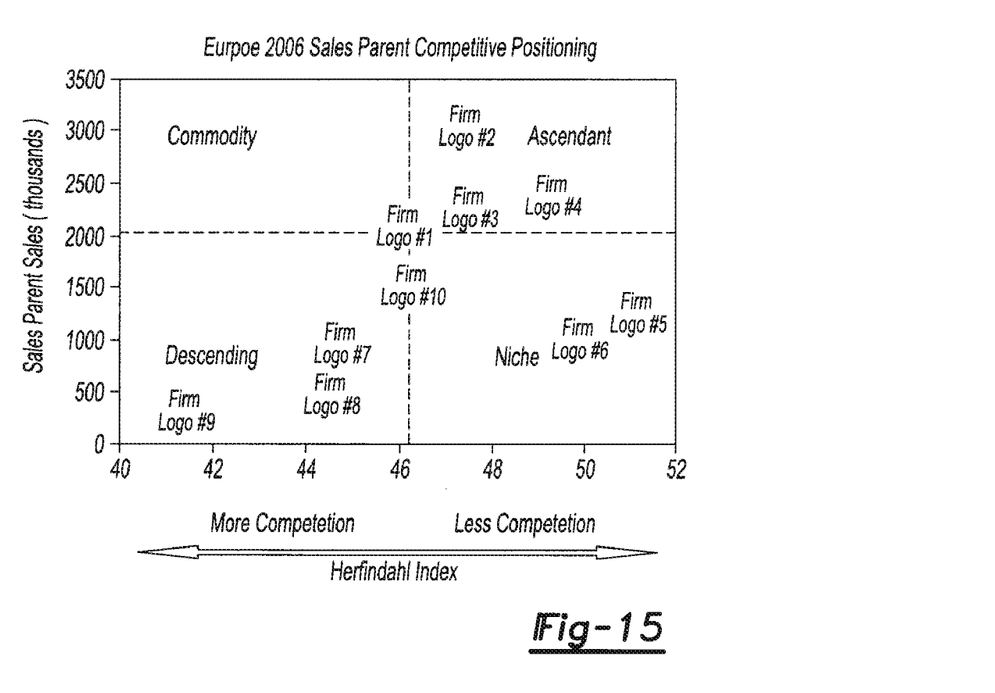
FIG. 15 illustrates an exemplary sales parent company chart correlating one or more parent companies.

FIG. 15 illustrates an exemplary sales parent company chart correlating one or more parent companies. Each parent company is positioned within the chart according to the sales volume and/or HHI of each parent company. The sales volume and HHI of each parent company is the average of the sum of the sales volume and HHI of each specific segment (e.g. vehicle type) respectively the parent company is competing in. As such, the sales and/or HHI of each parent company will change as a result of the decisions made in previous market segmentation analysis (referring specifically to FIGS. 3-14).

Figure 16:
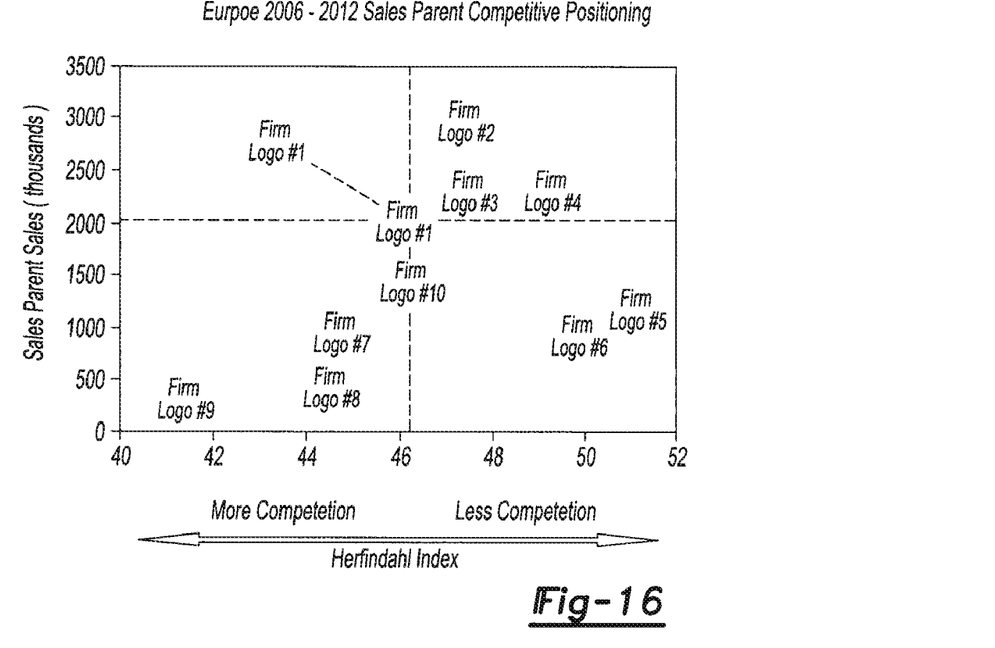
FIG. 16 illustrates an exemplary sales parent company chart illustrating a change in the sales and/or competition of each sales parent company.
Figure 17:
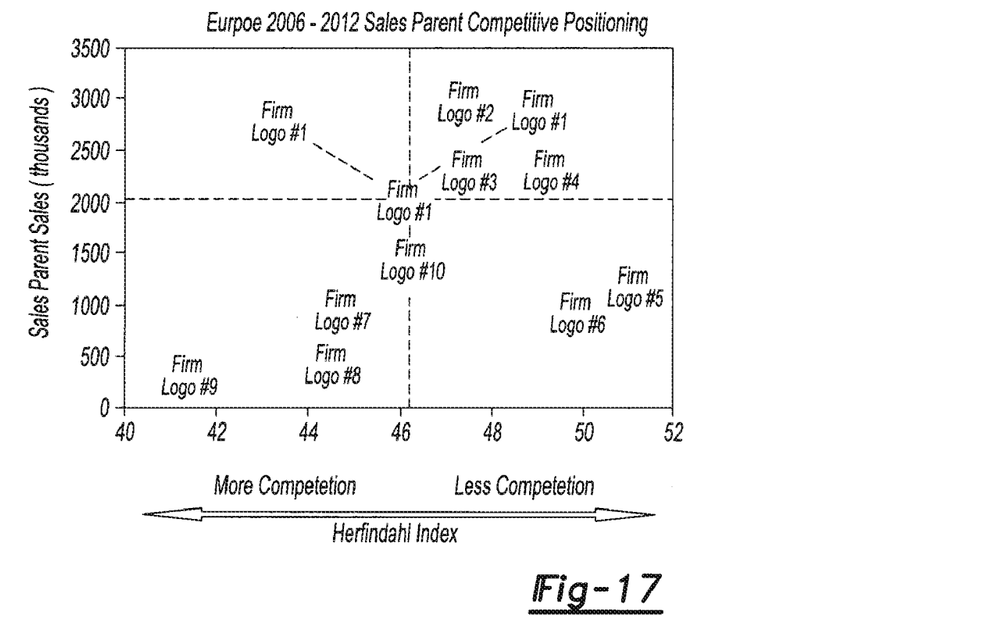
FIG. 17 illustrates an exemplary sales parent company chart illustrating a change in the sales and/or competition of each sales parent company.

As can be seen in FIGS. 16 and 17, the sales volume and HHI of a parent company can change based upon the market segmentation analysis discussed above over a period of time. As such, a user can make product changes according to the market analysis described above to effectuate the volume sales and/or HHI of a parent company.

Figure 18:
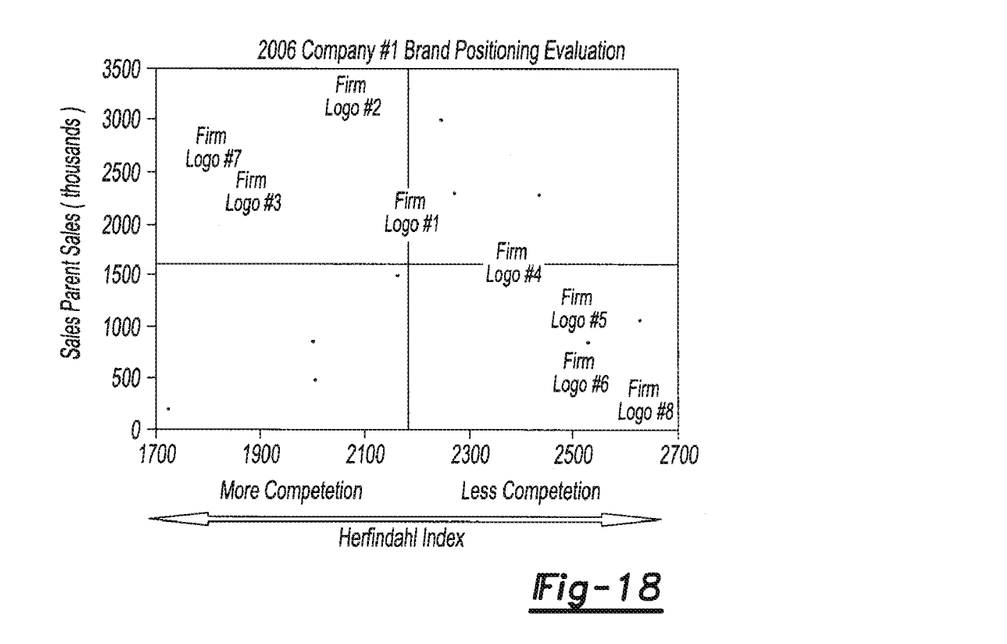
FIG. 18 illustrates an exemplary brand chart correlating one or more brands of a company.

FIG. 18 illustrates an exemplary brand chart correlating one or more brands of a company. As can be seen in FIG. 18, each brand is positioned within the chart according to the sales volume and/or HHI of each brand. The sales volume and HHI of each brand is the average of the sum of the sales volume and HHI of each specific segment (e.g. vehicle type) the brand is competing in. As such, the sales and/or HHI of each brand of a company will change as a result of the decisions made in the previous market segmentation analysis discussed above (referring specifically to FIGS. 3-14).

Accordingly, the user can make product changes according to the market segmentation analysis described above to effectuate the volume sales and/or HHI of a parent company and/or brand.

Figure 19:
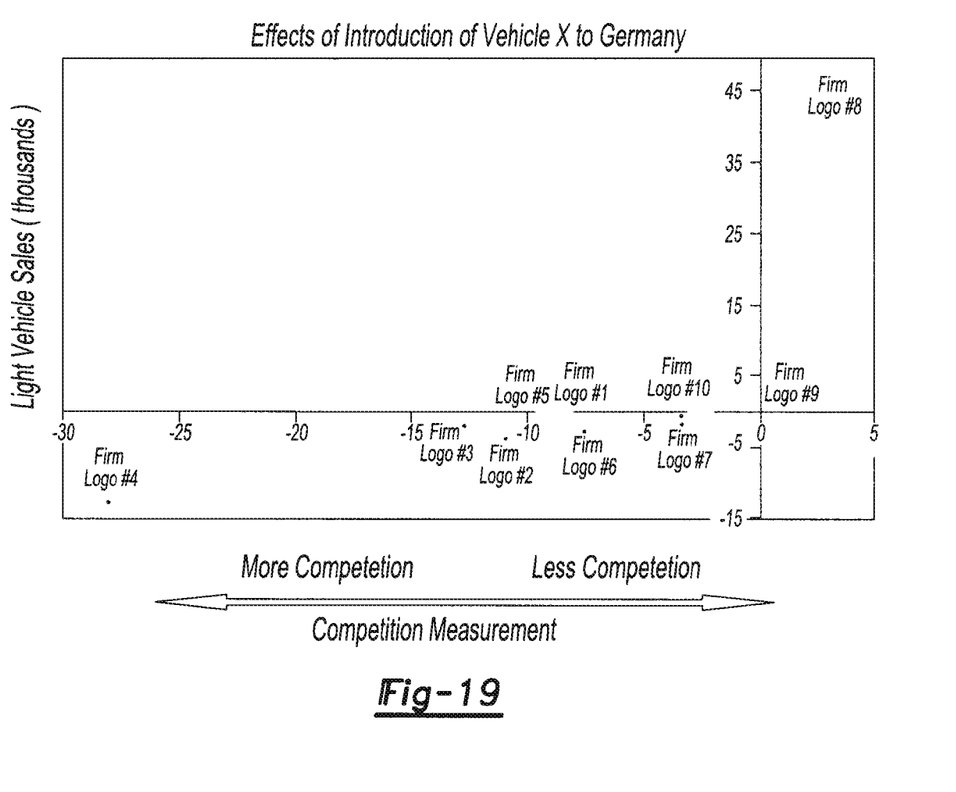
FIG. 19 illustrates an exemplary chart illustrating the impact of introducing a new vehicle in a country according to the present invention and the effect on the competition exposure to businesses involved in the market.

In another aspect of the present invention, a chart can be formulated illustrating the changes in sales volume and/or HHI of each parent company, brand, product type, or otherwise based upon introducing a new vehicle. One specific example is illustrated in FIG. 19. FIG. 19 is an example of a formulated chart illustrating the competitive changes in parent companies based upon introducing a new vehicle to a particular country. It is contemplated that the resulting effects of the new introduction on competitors within an industry on both the sales volume measure and exposure to competition measure can be used as method of measuring punishment and reward matrices in multiplayer games as described in numerous game theory applications. It is envisioned that the applicability of game theory to these payoff matrices will be determined by the unique situations these payoff matrices present.

It should be understood that although only charts have been described above, other graphical representations, such as tables, diagrams, or otherwise can be used to display the segments and/or information pertaining to the segments.

It should be readily recognized that the system and method described above allows users to determine and manipulate sales competition within market segments of an industry.

The skilled artisan will recognize that although the system and method of the present invention has been described in relation to the automotive industry, the system may also be used to measure sales competition for other market segments in other industries.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims. In addition, while a feature of the present invention may have been described in the context of only one of the illustrated embodiments, such feature may be combined with one or more other features of other embodiments, for any given application.

What is claimed is:

1. A method implemented by computer-based system for determining an entry point within a market segment of an industry, the method comprising:
    identifying a business and a market segment of an industry in which the business does not currently compete;
    determining current sales competition within the identified market segment for a plurality of different product types offered for sale by different businesses;
    formulating a first representation of the identified market segment in which the business does not currently compete based on the determined current sales competition, via the computer-based system;
    forecasting a performance of the identified business in the identified market segment if the business enters the identified market segment based upon movement of various offerings within the identified market segment over time, via the computer based system; and
    formulating a second representation illustrating a change in sales competition within the identified market segment if the business enters the identified market segment based on the forecasted performance, via the computer-based system.

2. The method of claim 1, further comprising presenting the most advantageous segment in which the business does not currently compete.

3. The method of claim 1, wherein determining a current sales competition comprises determining an estimated sales volume measurement.

4. The method of claim 3, wherein the sales volume measurement is a total of the number of units sold for each of the various product types offered for sale within the identified market segment.

5. The method of claim 1, wherein determining a current sales competition comprises using a Herfindahl Index measurement.

6. The method of claim 5, wherein the Herfindahl Index measurement is a measure of the level of competition between various existing product types offered for sale within the identified market segment.

7. The method claim 1, wherein forecasting comprises forecasting based upon a change in product types offered for sale within the identified segment.

8. The method of claim 1, wherein the second representation illustrates formulated values over a period of time.

9. The method of claim 1, wherein determining sales competition further comprises determining sales competition of a parent company of the identified business.

10. The method of claim 1, wherein determining sales competition further comprises determining sales competition of product types of a parent company of the identified business.

11. The method of claim 1, wherein the product types include different brands of the market segment.

12. The method of claim 1, further comprising:
    identifying a second market segment of an industry in which the identified business competes with at least one product type;
    determining current sales competition within the identified market segment for a plurality of different product types offered for sale by different businesses;
    formulating a third representation of the identified market segment in which the business competes based on the determined current sales competition, via the computer-based system;
    forecasting a performance of the identified business segment in which the business already competes if the business exits the second market segment based upon movement of various offerings within the identified market segment over time, via the computer based system; and
    formulating a fourth representation illustrating a change in sales competition within the identified second market segment if the business exits the second market segment based on the forecasted performance, via the computer-based system.

13. The method of claim 12, further comprising presenting the most disadvantageous segments the business already competes in.

14. A method implemented by a computer-based system for determining an exit point within a market segment of an industry, the method comprising
    identifying a business and a market segment of an industry in which the identified business competes with at least one product type;
    determining current sales competition within the identified market segment for a plurality of different product types offered for sale by different businesses;
    formulating a first representation of the identified market segment in which the business competes based on the determined current sales competition, via the computer-based system;
    forecasting a performance of the identified business segment in which the business already competes if the business exits the second market segment based upon movement of various offerings within the identified market segment over time, via the computer based system; and
    formulating a second representation illustrating a change in sales competition within the identified second market segment if the business exits the second market segment based on the forecasted performance, via the computer-based system.

15. The method of claim 14, further comprising presenting the most disadvantageous segment in which the business does not currently compete.

16. The method of claim 14, wherein determining a current sales competition comprises using a Herfindahl Index measurement.

17. The method claim 14, wherein forecasting comprises forecasting based upon a change in product types offered for sale within the identified segment.

18. The method of claim 14, wherein the second representation illustrates formulated values over a period of time.

19. A non-transitory computer-readable storage containing instructions thereon that when executed by the computer cause the computer to perform operations comprising:
- identifying a business and a market segment of an industry in which the business does not currently compete;
- determining current sales competition within the identified market segment for a plurality of different product types offered for sale by different businesses;
- formulating a first representation of the identified market segment in which the business does not currently compete based on the determined current sales competition;
- forecasting a performance of the identified business in the identified market segment if the business enters the identified market segment based upon movement of various offerings within the identified market segment over time; and
- formulating a second representation illustrating a change in sales competition within the identified market segment if the business enters the identified market segment based on the forecasted performance.

20. The storage of claim 19, wherein the instructions cause the computer to perform further operations comprising:
- identifying a second market segment of an industry in which the identified business competes with at least one product type;
- determining current sales competition within the identified market segment for a plurality of different product types offered for sale by different businesses;
- formulating a third representation of the identified market segment in which the business competes based on the determined current sales competition;
- forecasting a performance of the identified business segment in which the business already competes if the business exits the second market segment; and
- formulating a fourth representation illustrating a change in sales competition within the identified second market segment if the business exits the second market segment based on the forecasted performance.

\* \* \* \* \*